United States Patent
Wageman (10) Patent No.: US 7,945,029 B1
(45) Date of Patent: May 17, 2011

(54) TRANSLATION SERVER FOR FACILITATING OPERATIONS WITH MULTIPLE MEDIA MESSAGING SYSTEMS

(75) Inventor: Anthony J. Wageman, Lee's Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1416 days.

(21) Appl. No.: 11/414,840

(22) Filed: May 1, 2006

(51) Int. Cl.
  H04M 1/64 (2006.01)
  H04M 11/10 (2006.01)
  G06F 15/16 (2006.01)
(52) U.S. Cl. .................. 379/88.25; 455/413; 709/227
(58) Field of Classification Search .... 379/88.13–88.18, 379/88.04, 88.25, 88.26; 455/413; 709/219, 709/206, 227
  See application file for complete search history.

(56) References Cited

U.S. PATENT DOCUMENTS

| | | | | |
|---|---|---|---|---|
| 6,330,308 | B1* | 12/2001 | Cheston et al. | 379/88.04 |
| 6,681,257 | B1* | 1/2004 | Patel et al. | 709/245 |
| 6,711,242 | B2* | 3/2004 | White et al. | 379/88.25 |
| 6,711,243 | B1* | 3/2004 | Holt | 379/88.26 |
| 6,882,708 | B1* | 4/2005 | Bedingfield et al. | 379/88.18 |
| 7,012,998 | B1* | 3/2006 | Blackburn et al. | 379/88.18 |
| 7,209,551 | B1* | 4/2007 | Dudley et al. | 379/88.13 |
| 2005/0287993 | A1* | 12/2005 | Gogic | 455/413 |

OTHER PUBLICATIONS

J. Klensin, "Simple Mail Transfer Protocol," Request for Comments 2821, Apr. 2001.
J. Rosenberg, et al., "SIP: Session Initiation Protocol," Request for Comments 3261, Jun. 2002.
M. Crispin, "Internet Message Access Protocol—Version 4 rev1," Request for Comments 3501, Mar. 2003.
G. Vaudreuil and G. Parsons, "Voice Profile for Internet Mail—version 2 (VPIMv2)," Request for Comments 3801, Jun. 2004.
G. Parsons, "Voice Profile for Internet Mail (VPIM) Addressing," Request for Comments 3804, Jun. 2004.
G. Vaudreuil, "Voice Messaging Directory Service," Request for Comments 4237, Oct. 2005.
G. Vaudreuil, "Voice Message Routing Service," Request for Comments 4238, Oct. 2005.
S. McRae and G. Parsons, "Internet Voice Messaging (IVM)," Request for Comments 4239, Nov. 2005.

* cited by examiner

*Primary Examiner* — Gerald Gauthier
*Assistant Examiner* — Mohammad Islam (57) ABSTRACT

A telecommunications network includes multiple media messaging systems, such as voicemail platforms. A translation server stores messaging system data that associates each mailbox with a routing address (e.g., an IP address) that can be used to reach the media messaging system that hosts the mailbox. The translation server receives a translation request that includes an identification of a destination mailbox and a service code. The service code indicates that a routing address for a media messaging system is being requested. In response to the translation request, the translation server obtains from the messaging system data the routing address associated with the media messaging system that hosts the destination mailbox, and the translation server returns the routing address in a translation response. The routing address may then be used to send a call or to send a media message to the media messaging system that hosts the destination mailbox.

17 Claims, 5 Drawing Sheets

TRANSLATION SERVER FOR FACILITATING OPERATIONS WITH MULTIPLE MEDIA MESSAGING SYSTEMS

BACKGROUND

1. Field of the Invention

The present invention relates to telecommunications and, more particularly, to methods and systems for facilitating operations with multiple media messaging systems, wherein a translation server provides information for routing communications to the appropriate media messaging system.

2. Description of Related Art

Media messaging systems, such as voicemail platforms, are increasingly being used to receive media messages for subscribers who are unavailable to answer calls. As a result, the number of different media messaging systems has proliferated in many telecommunications networks.

For example, different media messaging systems may cover different geographic regions in a telecommunication service provider's service area. In addition to such regional media messaging systems, businesses and other enterprises may operate their own media messaging systems.

Although each media messaging system may allow a subscriber to access media messages that have been received into his mailbox, it is also desirable for the subscriber to be able to send media messages from his mailbox to other mailboxes, regardless of whether the destination mailbox is hosted on the same or a different media messaging system. However, the ability to perform such inter-system mailbox-to-mailbox messaging is complicated by the increasing number of different media messaging systems and by the fact that different media messaging systems may come from different vendors and may have different functionalities.

Accordingly, there is a need for methods and systems that can facilitate operations with multiple media messaging systems in a telecommunications network.

SUMMARY

In a first principal aspect, an exemplary embodiment of the present invention provides a method for mailbox-to-mailbox media messaging. In accordance with the method, a first media messaging system receives a selection of a destination mailbox. The first media messaging system sends a translation request to a translation server. The translation request includes an identification of the destination mailbox. The first media messaging system receives a translation response from the translation server. The translation response includes a routing address for routing to a second media messaging system, via a packet-switched network, wherein the second media messaging system hosts the destination mailbox. The first media messaging system signals to the second media messaging system, via the packet-switched network, to validate the destination mailbox. The first media messaging system receives a media message for the destination mailbox. The first media messaging system sends the media message to the second media messaging system, via the packet-switched network.

In a second principal aspect, an exemplary embodiment of the present invention provides a translation server. The translation server comprises a network interface communicatively coupled to a packet-switched network, translation logic communicatively coupled to the network interface, and messaging system data accessible by the translation logic. The messaging system data associates mailbox identifiers with routing addresses for routing to media messaging systems. The translation logic is configured to obtain from the messaging system data a routing address associated with a destination mailbox identifier, in response to the network interface receiving a translation request containing the destination mailbox identifier and a predetermined service code.

In a third principal aspect, an exemplary embodiment of the present invention provides a method for sending a call to a called party to a voicemail mailbox. In accordance with the method, a translation request is transmitted to a translation server. The translation request includes an identification of the voicemail mailbox and a voicemail service code. A translation response is received from the translation server. The translation response includes a routing address for routing to a voicemail platform via a packet-switched network, wherein the voicemail platform hosts the voicemail mailbox. Call set-up signaling is transmitted to the routing address to establish the call to the voicemail platform.

DETAILED DESCRIPTION OF EXEMPLARY EMBODIMENTS

1. Overview

The present invention, in its exemplary embodiments, provides a translation server that can facilitate the use of multiple media messaging systems in a telecommunications network. Each media messaging system may host a plurality of mailboxes that can receive voicemail messages, video messages, text messages, or other types of media messages. For example, the media messaging systems could be voicemail platforms for receiving voicemail messages. Each mailbox may be associated with an identifier, such as a telephone number of the mailbox's subscriber. The translation server functions to translate the identifier of a particular mailbox into an identifier of the particular media messaging system (from among the multiple media messaging systems in the telecommunications network) that hosts the particular mailbox. In this way, when a mailbox is selected as a destination to receive media, the translation server may facilitate the routing of the media to the proper media messaging system.

A media messaging system might receive media in various ways. As one example, a call to called party may be forwarded to a media messaging system when a call forwarding condition is met, such as when the called party is busy or does not answer. Once the call is established to the media messaging system, the caller may leave a message, such as a voicemail message, in the called party's mailbox.

To facilitate the process of forwarding the call to the proper media messaging system, a network element, such as a media gateway controller, may send a translation request to a translation server. The translation request may identify the called party's mailbox, for example, by the called party's telephone number. The translation server may reply with a translation response that identifies the media messaging system that hosts the called party's mailbox. The translation response may identify the media messaging system by a routing address that may be used to route the call to the media message system. The routing address could be, for example, an Internet Protocol (IP) address, Uniform Resource Identifier (URI), or domain name. The media gateway controller may then transmit call set-up signaling to the identified routing address to establish the call to the proper media messaging system.

As another example, a first user may access the first user's mailbox and select a second user's mailbox as a destination to receive a media message. The first user may do this, for example, to reply to a voicemail message from the second user or to forward a voicemail message to the second user. If the second user's mailbox is not hosted on the first user's media messaging system, then the first user's media messaging system may send a translation request to a translation server. The translation request may identify the second user's mailbox, for example, by the second user's telephone number. The translation server may reply with a translation response that includes a routing address for routing to the media messaging system that hosts the second user's mailbox.

The first user's media messaging system may then contact the second user's media messaging system, using the routing address identified by the translation server, to validate the second user's mailbox and to obtain the second user's name announcement. The first user's media messaging system may play the second user's name announcement to the first user and receive a media message from the first user for dispatch to the second user's mailbox. The first user's media messaging system may then send the media message to the second user's media messaging system, for example, using the Simple Mail Transfer Protocol (SMTP).

To facilitate its translation function, the translation server may store messaging system data that associates each mailbox with one or more routing addresses that may be used to reach the media messaging system that hosts the mailbox. Each mailbox could be identified in the messaging system data by a telephone number, i.e., by the mailbox subscriber's telephone number. Alternatively, groups of mailboxes could be identified by ranges of telephone numbers that are all hosted by a particular media messaging system. The one or more routing addresses, may include, for example, IP addresses, port numbers, URIs, and/or domain names.

The messaging system data may be accessed by translation logic in the translation server. For example, the translation server may receive a translation request that includes an identification of a particular mailbox. The translation logic may look up the particular mailbox in the messaging system data to identify the media messaging system that hosts the particular mailbox. The translation logic may then formulate a translation response that includes one or more routing addresses for routing to the identified media messaging system.

The translation logic may perform this translation function in response to a predetermined service code in the translation request. Thus, the service code indicates that a routing address for a media messaging system is being sought. The service code in the translation request could be, for example, a digit string prepended to the mailbox identification. Alternatively, the destination port number of translation request could serve as the service code. Other types of service codes could also be used.

In this way, the translation server can facilitate messaging operations, such as forwarding calls to voicemail or mailbox-to-mailbox messaging, in a telecommunications network that has multiple messaging systems.

2. Exemplary Network Architecture

Figure 1:
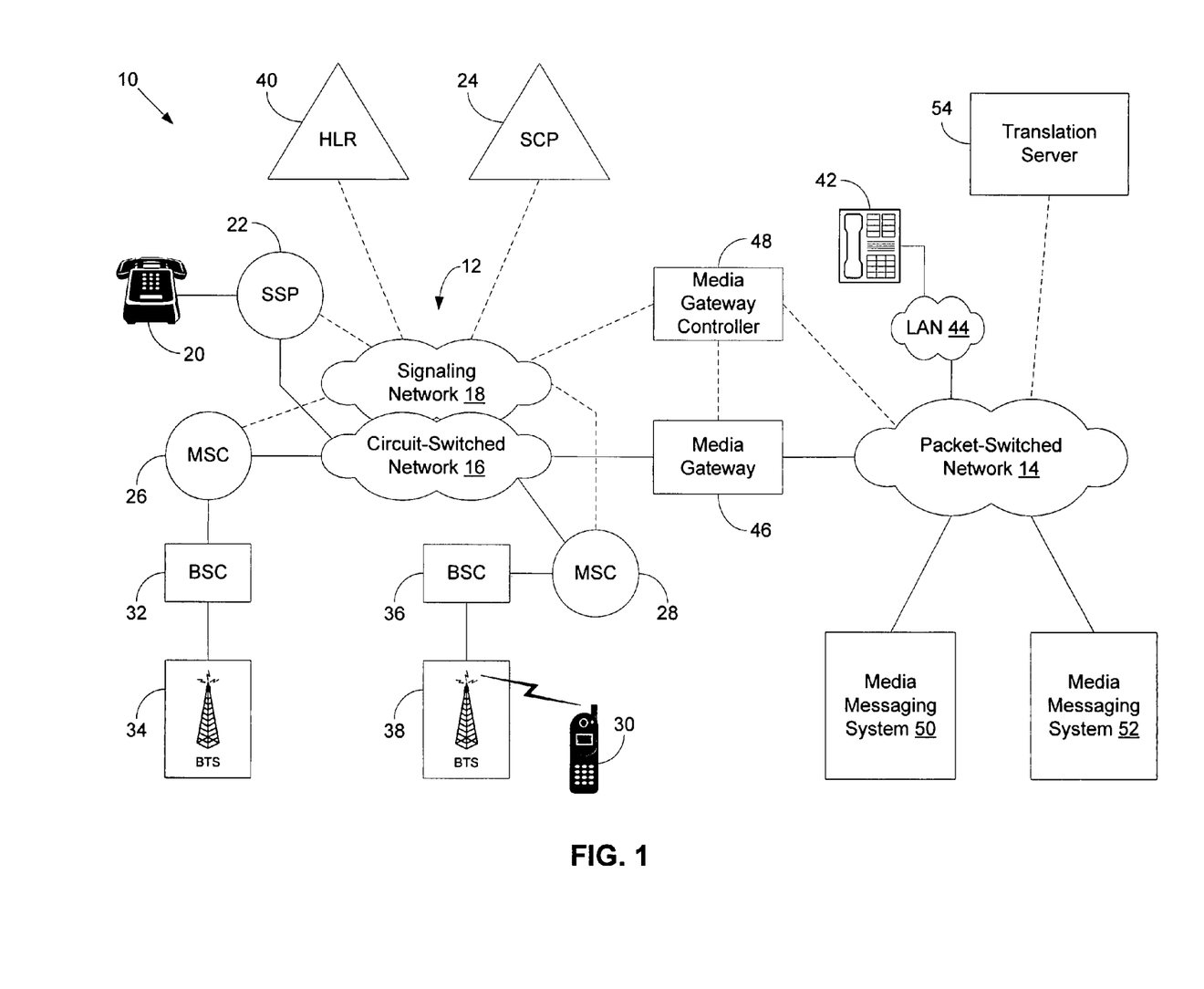
FIG. 1 is a block diagram of a telecommunications network, in accordance with an exemplary embodiment of the present invention.

FIG. 1 is a block diagram of an exemplary telecommunications network 10, in which exemplary embodiments of the present invention may be employed. In FIG. 1, connections that carry primarily voice or other media are shown as solid lines and connections that carry primarily signaling are shown as dashed lines.

Telecommunications network 10 may include a legacy telephone network 12 and a packet-switched network 14. Legacy telephone network 12 could be, for example, the public switched telephone network (PSTN) that uses an out-of-band signaling system, such as Signaling System 7 (SS7) to route calls. Thus, legacy telephone network 12 may include a circuit-switched network 16 that carries bearer traffic, i.e., the voice or other media in calls, and a signaling network 18 that carries signaling traffic used to set up, tear down, monitor, and control calls. Circuit-switched network 16 may include a plurality of trunks, with each trunk carrying media in a time division multiplex (TDM) format. Signaling network 18 may include a plurality of networked signal transfer points (STPs).

Legacy telephone network 12 may be connected to various types of telephony endpoints. For example, legacy telephone network 12 may be connected to landline stations, such as landline telephone 20, via switching systems, such as service switching point (SSP) 22. SSP 22 may have a bearer connection to circuit-switched network 16 and a signaling connection to signaling network 18. To provide various types of telecommunications services, SSP 22 may communicate with a service control point (SCP) 24 via signaling network 18. Although FIG. 1 shows legacy telephone network 12 connected to only one landline station via one SSP, it is to be understood that network 12 could be connected to multiple landline stations via multiple SSPs.

Legacy telephone network 12 may also be connected to wireless telecommunications systems. For example, legacy telephone network 12 may be connected to one or more mobile switching centers (MSCs), such as MSC 26 and MSC 28. MSCs 26 and 28 may, in turn, be connected to respective radio access networks that provide wireless coverage for mobile stations, such as wireless telephone 30. For example, MSC 26 be connected to a radio access network exemplified by a base station controller (BSC) 32 and a base transceiver station (BTS) 34, and MSC 28 may be connected to a radio access network exemplified by a BSC 38 and a BTS 40. BTSs 34 and 38 may each communicate with mobile stations, such as wireless telephone 30, via an air interface, using an air interface communications format, such as TDMA, CDMA, GSM, or EV-DO. Although FIG. 1 shows only two MSCs, with each MSC connected to one BTS via one BSC, it is to be understood that legacy telephone network 12 could be connected to a greater or fewer number of MSCs, and each MSC could be connected to multiple BTSs via multiple BSCs.

MSCs 26 and 28 may each have a bearer connection to circuit-switched network 16 and a signaling connection to signaling network 18. To provide telecommunications services to mobile stations MSCs 26 and 28 may communicate with a home location register (HLR) 40 via signaling network 18. MSCs 26 and 28 may also communicate with SCP 24 via signaling network 18. The communications with HLR 40 may conform to IS-41 specifications. A recent revision of the IS-41 specifications, ANSI/TIA/EIA-41-D-97, published in December 1997, is incorporated herein by reference. The communications with SCP 24 may be "Wireless Intelligent Network" (WIN) signaling, e.g., as described in TIA/EIA/IS-771, published in July 1999.

Packet-switched network 14 routes voice, data, and/or other media in the form of packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols. Packet-switched network 14 may include one or more private networks and/or public networks, such as the Internet.

In an exemplary embodiment, packet-switched network 14 is used for voice-over-Internet Protocol (VoIP) calls. Signaling protocols, such as the Session Initiation Protocol (SIP), may be used to set up and/or manage communication sessions through packet-switched network 14 for VoIP calls and/or for other purposes. Various types of network elements, such as call session control functions (CSCFs) and application servers, may also be involved in the signaling used to set up and manage communication sessions through packet-switched network 14. Once a VoIP call is established, protocols such as the Real-Time Transport Protocol (RTP) may be used to carry voice or other media through packet-switched network 14 in a real-time packet format. Relevant aspects of SIP are described in Rosenberg, et al., "SIP: Session Initiation Protocol," Request for Comments 3261 (June 2002), which is incorporated herein by reference.

Various types of user devices may engage in VoIP calls or other types of communication sessions through packet-switched network 14. Such user devices may include VoIP telephones, such as VoIP telephone 42 communicatively coupled to packet-switched network 14 via a local area network (LAN) 44. Such user devices may also include mobile communication devices, which may communicate with packet-switched network 14, e.g., via a wireless local area network (WLAN), using an air interface format such as 802.11x, HiperLAN, HomeRF, or Bluetooth. Other types of user devices, such as audio-equipped computers or analog telephones connected to media terminal adapters (MTAs), might also use packet-switched network 14 for VoIP calls.

In some cases, a user device may be able to engage in calls that are carried through both legacy telephone network 12 and packet-switched network 14. For example, landline telephone 10 and wireless telephone 30 may be able to originate and receive calls that extend through both legacy telephone network 12 and packet-switched network 14. The media in such calls may be conveyed through one or more media gateways, such as media gateway 46. As shown in FIG. 1, media gateway 46 is connected to both circuit-switched network 16 and to packet-switched network 14. Media gateway 46 may convert the media conveyed in a call between the TDM or other format used in circuit-switched network 16 and the RTP or other format used in packet-switched network 14.

Media gateway 46 may be controlled by a media gateway controller 48, e.g., using a protocol such as H.248 or the Media Gateway Control Protocol (MGCP). Media gateway controller 48 may also be communicatively coupled to signaling network 18 and to packet-switched network 14. For example, media gateway controller 48 may engage in SS7 signaling via signaling network 18 and engage in SIP signaling via packet-switched network 14.

User devices may also communicate with other types of endpoints, such as media messaging systems, via packet-switched network 14. In this regard, packet-switched network 14 may be communicatively coupled to a plurality of media messaging systems, exemplified in FIG. 1 by media messaging systems 50 and 52. Media messaging systems 50 and 52 could be on the same subnetwork of packet-switched network 14. Alternatively, media systems 50 and 52 could be on different subnetworks that are communicatively coupled together, for example, via an Internet backbone network.

Media messaging systems 50 and 52 may each host one or more "mailboxes" that can receive various types of media messages. For example, media messaging systems 50 and 52 could be voicemail platforms that can receive voicemail messages. More generally, a media message could involve various types of media, such as voice, video, and/or text, depending on the capabilities of the media messaging system that receives the media message.

A mailbox may be associated with one or more subscribers who are authorized to access the media messages received in the mailbox. For example, a media messaging system could be maintained by an enterprise, e.g., to provide mailboxes to the enterprise's employees. As another example, a media messaging system could be maintained by a telecommunications service provider to provide mailboxes to its customers, e.g., for personal messages.

In addition, a mailbox may be associated with a particular user device of the subscriber, such as landline telephone 20, wireless telephone 30, or VoIP telephone 42. For example, a subscriber's mailbox may be identified by the telephone number of one of the subscriber's user devices, e.g., the subscriber's wireless telephone, and the subscriber's mailbox may be used as an alternative destination for calls directed to that user device. Thus, if a call to a subscriber's user device cannot be completed, e.g., because the subscriber's user device is busy or does not answer, the call may instead be forwarded to the subscriber's mailbox. The caller may then have the option of leaving a voicemail message or other type of message in the subscriber's mailbox.

Media messaging systems, such as media messaging systems 50 and 52 may also receive media messages in other ways. For example, a first user accessing his mailbox may be able to send a media message to a second user's mailbox, e.g., to reply to the second user's message or to forward a media message to the second user. The second user's mailbox could be hosted on a different media messaging system than the first user's mailbox. For example, the first user's may access his mailbox on media messaging system 50 and decide to send a media message to a second user's mailbox on media messaging 52. For such mailbox-to-mailbox media messaging, media messaging system 50 may transfer the media message to media messaging system 52, via packet-switched network 14, using a protocol such as the Simple Mail Transfer Protocol (SMTP). A recent version of SMTP is described in J. Klensin, "Simple Mail Transfer Protocol," Request for Comments 2821, April 2001, which is incorporated herein by reference.

A media messaging system, such as media messaging systems 50 and 52, may also receive media messages from other sources. For example, a media messaging system might receive media messages in e-mail messages or via a Web interface from sources such as audio-equipped computers.

To facilitate the routing of calls and media messages to the appropriate media messaging system, e.g., from among media messaging system 50 and 52, telecommunications network may include a translation server 54 communicatively coupled to packet-switched network 14. As described in more detail below, translation server 54 may translate an identifier of a mailbox (e.g., a telephone number) into an identifier of the media messaging system (e.g., IP address, URI, or domain name) that hosts the mailbox.

For example, translation server 54 may receive a translation request that identifies a mailbox hosted by media messaging system 50, and translation server 54 may reply with a translation response that includes an IP address or other identifier of media messaging system 50. The translation request could come from a network element such as media gateway controller 48, e.g., in order to direct a call to the identified mailbox. Alternatively, the translation request could come from another media messaging system, such as media messaging system 52, e.g., in order to validate the identified mailbox, to obtain a name announcement for the identified mailbox, or to send a media message to the identified mailbox.

The translation request could be, for example, a SIP INVITE message. The translation response could be, for example, a SIP 3xx redirection response, such as a SIP 302 "Moved Temporarily" response. It is to be understood that SIP is exemplary only, as other protocols could be used.

3. Exemplary Translation Server

Figure 2:
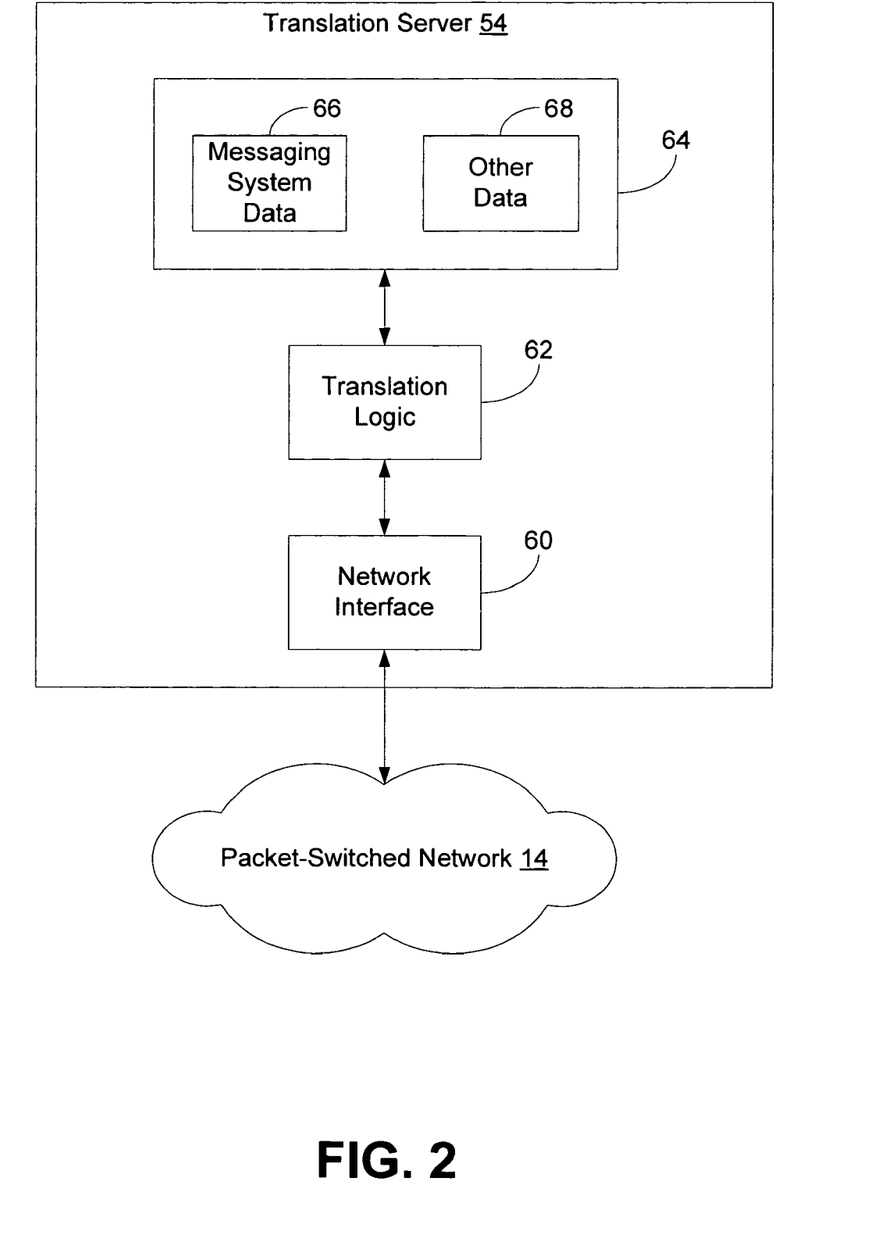
FIG. 2 is a block diagram of a translation server, in accordance with an exemplary embodiment of the present invention.

FIG. 2 is a functional block diagram of an exemplary translation server 54. Translation server 54 may include a network interface 60 communicatively coupled to packet-switched network 14, translation logic 62 communicatively coupled to network interface 60, and data storage 64 communicatively coupled to translation logic 62.

Data storage 64 may store messaging system data 66 as well as other data 68. Messaging system data 66 may include homing records for a plurality of media messaging systems, such as media messaging systems 50 and 52. A homing record for a media messaging system may identify the media messaging system (e.g., by IP address, port number, domain name, and/or URI), may identify the mailboxes that are hosted by that media messaging system, and may also include other information regarding that media messaging system.

A homing record may identify a mailbox in various ways, for example, by the telephone number of the subscriber or user device associated with the mailbox. A telephone number in a homing record could be a 10-digit number in the form of NPA-NXX-XXXX, in conformity with the North American Numbering Plan. Alternatively, a telephone number in a homing record could be an international telephone number (e.g., an E.164 telephone number) or could be in some other format. A homing record could list individual telephone numbers to identify the mailboxes hosted on a media messaging system. Alternatively, a homing record could identify a range of telephone numbers to identify a plurality of mailboxes on a media messaging system. For example, if a media messaging system hosts mailboxes with telephone numbers ranging from NPA-NXX-1000 through NPA-NXX-1999, the homing record for that media messaging system might identify the mailboxes by specifying the NPA, the NXX, "1000" as the beginning of the range, and "1999" as the end of the range.

Network interface 60 may receive translation requests and may transmit translation responses via packet-switched network 14. The translation queries could be, for example, SIP INVITE messages. The translation responses could be, for example, SIP 3xx redirection responses, such as 302 "Moved Temporarily" responses.

Translation logic 62 may perform translation functions to support the operations of media messaging systems, such as media messaging system 50 and 52. For example, translation logic 62 may obtain, from a translation request received by network interface 60, an identification of a destination mailbox and translate it into the IP address or other identification of the media messaging system that hosts the destination mailbox. Network interface 60 may then transmit a translation response that includes the IP address or other identification provided by translation logic 62.

Translation logic 62 may perform this translation function by accessing messaging system data 66 in data storage 64. For example, translation logic 62 may look up an identification of a destination mailbox in messaging system data 66 to find an IP address or other identification of the corresponding media messaging system.

Translation logic 62 may also perform other translation functions, for example, by accessing other data 68. Translation logic 62 may determine what type of translation to perform based on a service code contained in the translation request. For example, a predetermined service code in the translation request may indicate that a translation for a media messaging system is being requested. In response to receiving such a service code, translation logic 62 may access messaging system data 66 and obtain an IP address or other identifier of the appropriate media messaging system, as described above.

The predetermined service code in a translation request could be a digit string placed with the identification of the destination mailbox. For example, if the identification of the destination mailbox is a 10-digit telephone number, the predetermined service code could be a "22" digit string prepended to the 10-digit telephone number. Other predetermined service codes could be used. For example, the predetermined service code could be the destination port number of the translation request.

4. Exemplary Provisioning Architecture

Figure 3:
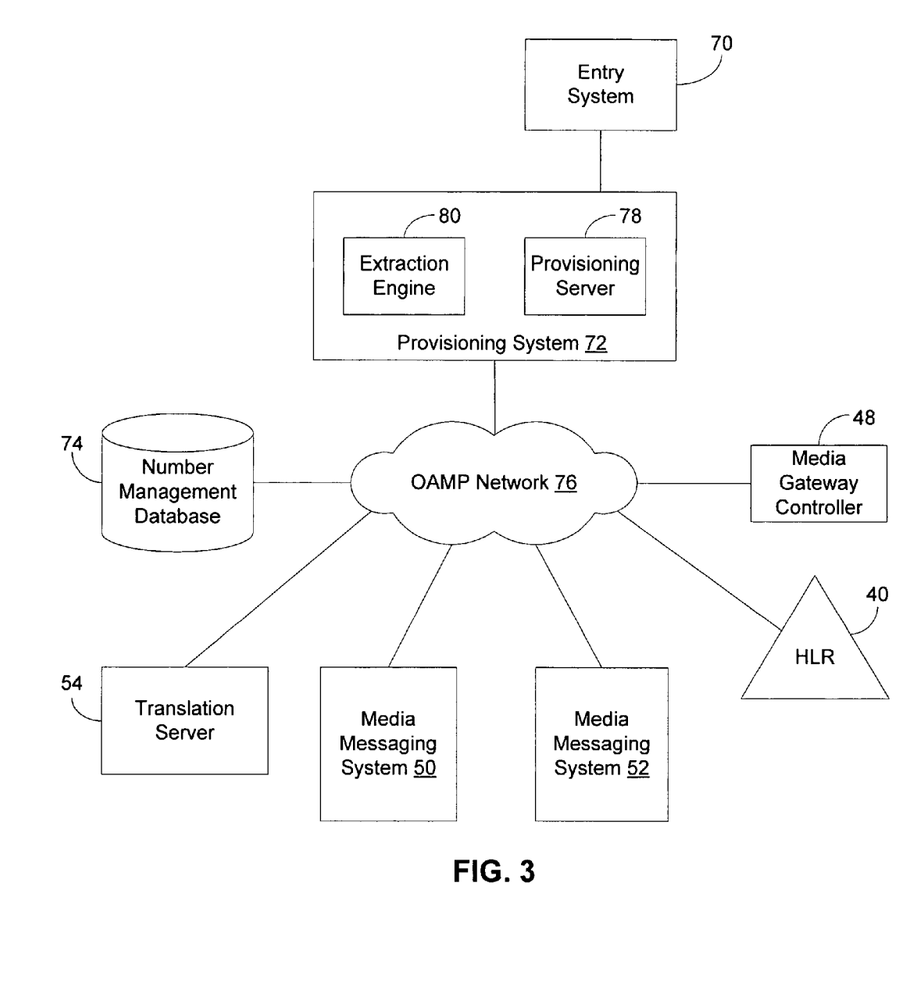
FIG. 3 is a block diagram of a provisioning architecture, in accordance with an exemplary embodiment of the present invention.

FIG. 3 illustrates an exemplary architecture for provisioning multiple network elements with information regarding media messaging mailboxes. An entry system 70 receives and processes orders from subscribers for new media messaging mailboxes and/or changes or deletions to existing media messaging mailboxes. An order may specify that a mailbox is to be associated with the subscriber's telephone number and may specify conditions (such as busy/no-answer) for forwarding calls to the mailbox.

A provisioning system 72 receives information from the orders entered into entry system 70 and uses the information to provision network elements, such as media gateway controller 48, HLR 40, media messaging systems 50 and 52, translation server 54, and a number management database 74, via OAMP network 76. Number management database 74 may store information regarding the telephone numbers of all of the subscribers to a particular telecommunications service provider. Thus, messaging system data 66 may be a subset of the information stored in number management database 74. OAMP network 76 may be a network used by the telecommunications service provider for operations, administration, maintenance, and provisioning. OAMP network 76 could be a part of packet-switched network 14.

In an exemplary embodiment, provisioning system 72 includes a provisioning server 78 and an extraction engine 80. To open a new mailbox associated with a given telephone number, provisioning server 78 may instruct a media messaging system, e.g., media messaging system 50, to activate a mailbox identified by the given telephone number. Provisioning server 78 may also indicate to number management database 74 that a new mailbox for the given telephone number has been opened on media messaging 50. Provisioning server 78 may also provision service profiles in HLR 40 and in media gateway controller 48 to indicate that calls to the given telephone number should be forwarded to the mailbox based on the call-forwarding conditions specified in the subscriber's order (e.g., call forwarding upon a busy or no-answer condition).

Extraction engine 80 may periodically (e.g., on a nightly basis) extract the new information placed in number management database 74 regarding media messaging mailboxes and use the information to update media messaging data 66 stored in translation server 54. In this way, media messaging data 66 can be kept up-to-date as new mailboxes are created and existing mailboxes are changed or deleted.

5. Exemplary Operation

Figure 4:
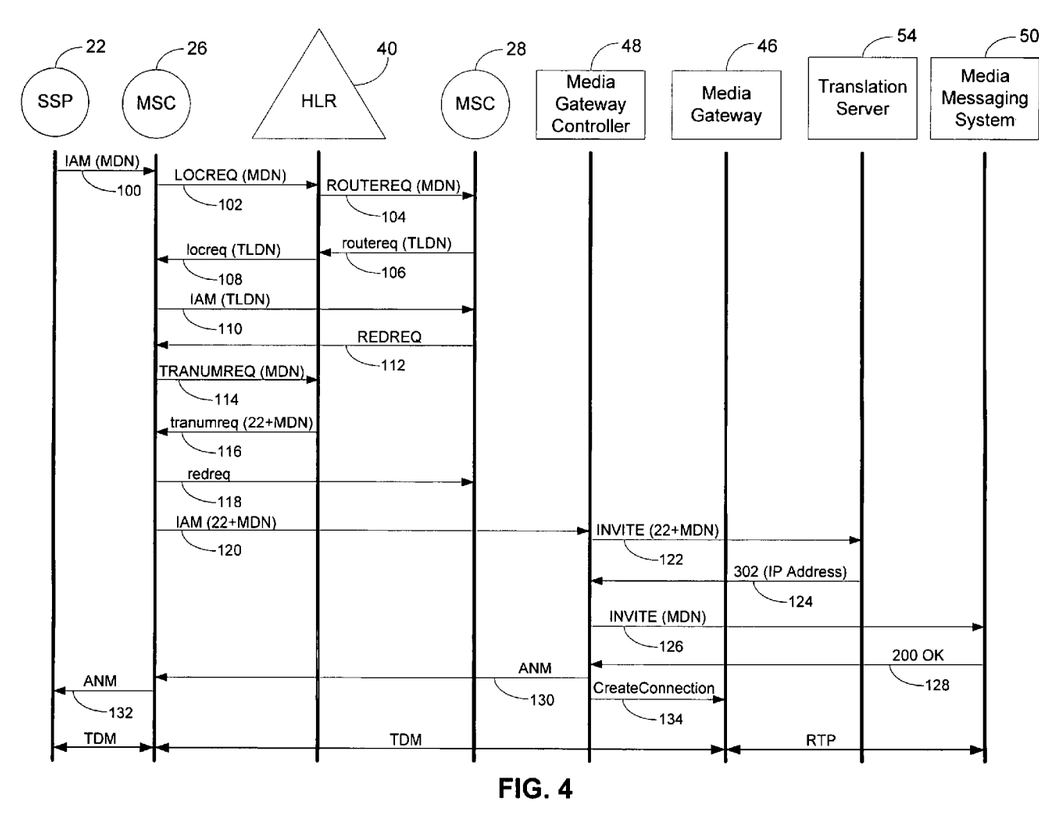
FIG. 4 is a simplified call flow diagram illustrating a process for sending a call to a called party to a voicemail mailbox, in accordance with an exemplary embodiment of the present invention.

FIG. 4 is a simplified call flow diagram illustrating an exemplary process for sending a call to a called party to a voicemail mailbox. FIG. 4 is simplified in that certain standard signaling messages, such as SS7 Address Complete Message (ACM) messages and SIP ACK messages, are not shown for purposes of clarity.

In the example of FIG. 4, the called party is using wireless telephone 30 while roaming, and the called party's voicemail mailbox is hosted by media messaging system 50. Although the called party is using a wireless telephone in this example, it is to be understood that calls to other types of communication devices, such as landline telephones (e.g., landline telephone 20) and VoIP telephones (e.g., VoI? telephone 42), could also be forwarded to their respective mailboxes.

The process may begin when a caller dials the telephone number of wireless telephone 30. The dialed telephone number could be, for example, a mobile directory number (MDN) of wireless telephone 30. In this example, the caller is using landline telephone 20 to place the call. Thus, in response to the caller's dialed digits, SSP 22 may transmit an SS7 Initial Address Message (IAM) to MSC 26, the home MSC of wireless telephone 30, as indicated by step 100. The SS7 IAM message may include the MDN of wireless telephone 30 as the called party. Although FIG. 4 illustrates the call flow for a caller using a landline telephone, it is to be understood that the caller might alternatively use a wireless telephone, VoIP telephone, or other telephony device to place the call.

In this example, wireless telephone 30 is roaming, in that wireless telephone 30 is operating in an area served by MSC 28 rather than in an area served by its home MSC 26. Thus, to locate wireless telephone 30, MSC 26 may transmit an IS-41 Location Request (LOCREQ) message to HLR 40, as indicated by step 102. The LOCREQ message may identify wireless telephone 30 by its MDN.

In response, HLR 40 may check a service profile for wireless telephone 30 and determine that wireless telephone 30 is currently being served by MSC 28. Thus, HLR 40 may transmit an IS-41 Route Request (ROUTEREQ) message to MSC 28, as indicated by step 104. The ROUTEREQ message may identify wireless telephone 30 by its MDN. MSC 28 may respond with an IS-41 routereq message that includes a temporary location directory number (TLDN) that can be used to route the call to wireless telephone 30, as indicated by step 106. HLR 40 may, in turn, provide the TLDN to MSC 26 in an IS-41 locreq message, as indicated by step 108. MSC 26 may then transmit an SS7 IAM message to MSC 28 to route the call using the TLDN, as indicated by step 110.

When MSC 28 receives the SS7 IAM message from MSC 26, MSC 28 may cause a page signal to be sent to wireless telephone 30. If wireless telephone 30 responds to the page signal, then MSC 28 may cause an alert signal to be sent to wireless telephone 30. In this example, however, wireless telephone 30 either fails to respond to the page signal or does not answer after being alerted. As a result, MSC 28 may transmit an IS-41 Redirection Request (REDREQ) message to MSC 26, as indicated by block 112. The REDREQ message may include a reason for the redirection, such as a no answer or no page response condition.

To determine how to redirect the call, MSC 26 may transmit an IS-41 TransferToNumber (TRANUMREQ) message to HLR 40, as indicated by step 114. The TRANUMREQ message may identify wireless telephone 30 by its MDN and may identify the condition that is the reason for the redirection. In response, HLR 40 may check a service profile for wireless telephone 30 to determine a forward-to number. In this example, the service profile for wireless telephone 30 indicates that the call should be forwarded to a number that corresponds to the digit string "22" prepended to the MDN of wireless telephone 30. Thus, as indicated by step 116, HLR 40 may send an IS-41 tranumreq message to MSC 26 that identifies the routing digits as "22" prepended to the MDN. As described below, the "22" is a service code that is used to route the call to the voicemail mailbox identified by the MDN of wireless telephone 30.

To indicate that the call is being redirected, MSC 26 may send an IS-41 redreq message to MSC 28, as indicated by step 118. MSC 26 may also transmit an SS7 IAM message to route the call to the called party identified as 22+MDN, as indicated by block 120. Based on the "22" prepended to the MDN, signaling network 18 routes the SS7 IAM message to media gateway controller 48.

Media gateway controller 48, in turn, determines from the "22" service code to seek routing information from translation server 54. To obtain the routing information, media gateway controller 48 may transmit a SIP INVITE message that includes the 22+MDN routing digits to translation server 54, as indicated by block 122. The 22+MDN routing digits could be part of the "Request-URI" field of the SIP INVITE message. Alternatively, the 22+MDN routing digits could be located in some other field of the SIP INVITE message.

Translation server 54 receives the SIP INVITE message, and translation logic 62 in translation server 54 determines from the "22" service code that translation into a routing address for a media messaging system is being requested. Translation logic 62 may then access messaging system data 66 to determine which media messaging system hosts the mailbox identified by the MDN supplied in the SIP INVITE message. In this example, translation logic 62 determines from messaging system data 66 that media messaging system 50 hosts the mailbox for wireless telephone 30, i.e., the mailbox identified by the MDN. Thus, translation server 54 may respond with a SIP 302 "Moved Temporarily" message that includes the IP address of media messaging system 50, as indicated by step 124.

Media gateway controller 48 may then transmit a SIP INVITE message to the identified IP address, as indicated by block 126. The SIP INVITE message may identify the mailbox, e.g., by the MDN. Media messaging system 50 receives the SIP INVITE message and, in this example, accepts the invited session by transmitting a SIP 200 OK message, as indicated by step 128. In some embodiments, media messaging system 50 might transmit one or more provisional responses before transmitting the 200 OK response. For example, media messaging system 50 may transmit a SIP 100 Trying response and a SIP 180 Ringing response before the SIP 200 OK response.

After receiving the SIP 200 OK message, media gateway controller 48 may transmit an SS7 Answer Message (ANM)

to MSC 26, as indicated by step 130, and MSC 26 may transmit an SS7 ANM to SSP 22, as indicated by step 132. Media gateway control 48 may then signal to media gateway 46 to create a connection for the call, e.g., using an H.248 CreateConnection request, as indicated by step 134.

In this way, the call may be established to the mailbox of wireless telephone 30, hosted on media messaging system 50. The media in the call may be carried between SSP 22 and MSC 26 and between MSC 26 and media gateway 46 via circuit-switched network 16, in a TDM format. Between media gateway 46 and media messaging system 50, the media may be carried via packet-switched network 14, in an RTP format. During the call, the caller may leave a voicemail message in the mailbox of wireless telephone 30. Depending on the capabilities of media messaging system 50 may also be able to leave a text message or other type of message in the mailbox. At some later point in time, the subscriber associated with wireless telephone 30 may log into his mailbox on media messaging system 50 to retrieve the message.

Figure 5:
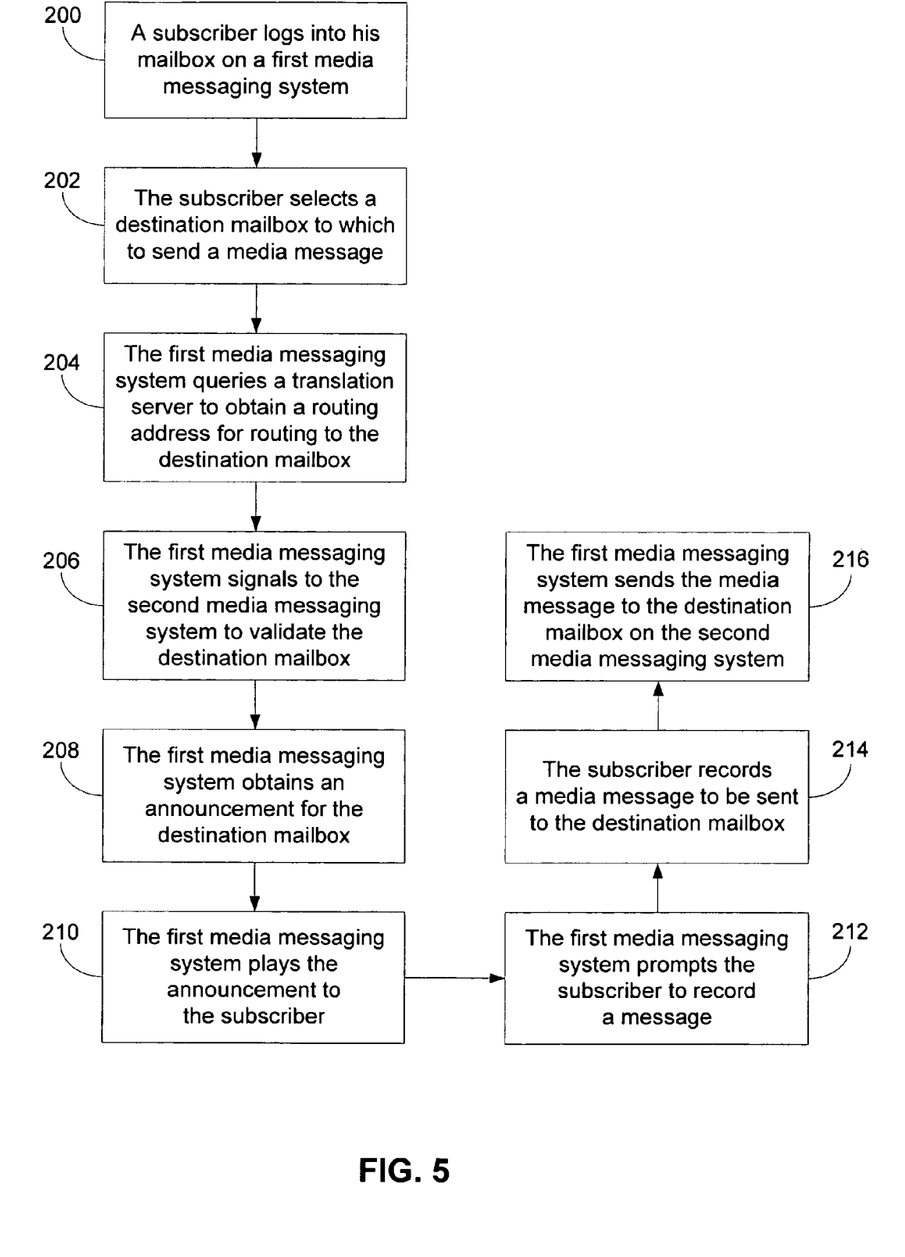
FIG. 5 is a flow chart illustrating a mailbox-to-mailbox messaging process, in accordance with an exemplary embodiment of the present invention.

In addition to receiving a media message from a calling party as illustrated in FIG. 4, a media messaging system may also receive a media message in a mailbox-to-mailbox messaging process. FIG. 5 is a flowchart illustrating an exemplary mailbox-to-mailbox messaging process. The process may begin when a subscriber logs into his mailbox on a first media messaging system, as indicated by block 200. The first media messaging system could be, for example, media messaging system 50, as shown in FIG. 1. The subscriber might log into the first media messaging system in various ways, for example, by making a voice call, by accessing a Web-based interface, or by using a visual voicemail client on a set-top box or mobile device. Once logged in, the subscriber may be able to perform various actions including, for example, checking for any media messages in his mailbox, changing his mailbox options, and sending media messages to other mailboxes.

In this example, the subscriber selects a destination mailbox to which to send a media message, as indicated by block 202. The subscriber might select the destination mailbox in connection with a media message that the subscriber received in his mailbox, e.g., in order to respond to a media message or to forward a media message. Alternatively, the subscriber might select a destination mailbox simply to send his own message. The subscriber might select the destination mailbox by entering a telephone number associated with the destination mailbox. Alternatively, the subscriber might identify the destination mailbox in other ways. For example, the subscriber might select a group list that specifies multiple destination mailboxes.

In some cases, the subscriber might select a destination mailbox that is also on the first media messaging system. In this example, however, the subscriber selects a destination mailbox that is hosted by a different media messaging system. Thus, the first media messaging system queries a translation server, e.g., translation server 54, to obtain a routing address for routing to the destination mailbox, as indicated by block 204. For example, the first media messaging system may send a SIP INVITE message to the translation server. The SIP INVITE message may include the identification of the destination mailbox as entered by the subscriber. The SIP INVITE message may also include a service code to indicate that a routing address to a media messaging system is being requested. The service code could be, for example, a digit string such as "22" that is placed with the destination mailbox identification in the "Request-URI" field of the SIP INVITE message. Alternatively, the service code could be placed in a special field of the SIP INVITE message, or the service code could be a destination port number of the SIP INVITE message.

The translation server may respond with a SIP 302 "Moved Temporarily" message that includes a routing address for routing to a second media messaging system that hosts the destination mailbox. The second media messaging system could be, for example, media messaging system 52, as shown in FIG. 1. The routing address could be, for example, an IP address of the second media messaging system.

The first media messaging system may then signal to the second media messaging system, using the IP address provided by the translation server, in order to validate the destination mailbox, as indicated by block 206. To validate the destination mailbox, the first media messaging system might signal to the second media messaging system, via packet-switched network 14, using a protocol such as the Internet Message Access Protocol (IMAP). A recent version of IMAP is described in M. Crispin, "Internet Message Access Protocol—Version 4rev1," Request for Comments 3501, March 2003, which is incorporated herein by reference.

To validate the destination mailbox, the first media messaging system may send an IMAP Login command to access the second media messaging system and then send an IMAP Select command to select the destination mailbox. If the second media messaging system responds with an "OK" result, the first media messaging system may consider the destination mailbox to have been successfully validated. The first media messaging system may then obtain an announcement for the destination mailbox, as indicated by block 208. To do this, the first media messaging system may send an IMAP Fetch command to the second media messaging system. If there is an announcement for the destination mailbox, e.g., an announcement of the name of the destination mailbox's user, then the second messaging system may provide it in an "OK" response to the Fetch command.

The first media messaging system may then play the announcement to the subscriber, as indicated by block 210. If the first media messaging system was unable to obtain an announcement for the destination mailbox, the first media messaging system may instead convey the telephone number associated with the destination mailbox. It is to be understood that the playback of the announcement or the telephone number to the subscriber may be used to indicate to the subscriber that the destination mailbox is valid. If the destination mailbox is not valid, then the first media messaging system may instead convey a prompt such as: "Not a valid mailbox, please select another."

After playback of the announcement or the telephone number of the destination mailbox, the first media messaging system may prompt the user to record a message, as indicated by block 212. For example, the first media messaging system may convey the prompt: "At the tone, record your message, and then press #." In response, the subscriber may record a media message and indicate that the message is ready to be sent to the destination mailbox, as indicated by block 214. The subscriber may be given the opportunity to review and/or re-record the message before indicating that the message is ready to be sent.

Once the media message is ready to be sent, the first media messaging system may send the message to the second media messaging system, as indicated by block 216. The first media messaging system may do this by using a protocol such as SMTP to convey the media message via packet-switched network 14. The first media messaging system may also indicate to the subscriber that the media message has been sent, e.g., by a "Message sent" statement to the subscriber.

To use SMTP to transfer the media message, the first media messaging system may initiate an SMTP session by sending an SMTP EHLO command to the second media messaging system's IP address provided by the translation server. The first media messaging system may then identify the sender in an SMTP "MAIL FROM:" command and may identify the recipient in an SMTP "RCTP TO:" command. The recipient in this case corresponds to the destination mailbox. The first media messaging system may then send the media message, in an encoded form, following an SMTP DATA command. To complete the SMTP session, the first media messaging system sends an SMTP QUIT command.

In this way, the translation server may be used to provide addresses so that calls and media messages may be routed to the appropriate media messaging systems. Even though the media messaging systems may come from different vendors, interoperability can be achieved by having the media messaging systems use only a few, open protocols, e.g., SIP, IMAP, and SMTP.

6. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for mailbox-to-mailbox media messaging, said method comprising:
a first media messaging system receiving a selection of a destination mailbox;
said first media messaging system sending a translation request to a translation server, said translation request including an identification of said destination mailbox;
said first media messaging system receiving a translation response from said translation server, said translation response including a routing address for routing to a second media messaging system via a packet-switched network, wherein said second media messaging system hosts said destination mailbox;
said first media messaging system signaling to said second media messaging system, via said packet-switched network, to validate said destination mailbox;
after validating said destination mailbox, said first media messaging system receiving a media message for said destination mailbox; and
said first media messaging system sending said media message to said second media messaging system, via said packet-switched network.

2. The method of claim 1, wherein said identification of said destination mailbox is a telephone number.

3. The method of claim 2, wherein said translation request includes a predetermined service code.

4. The method of claim 3, wherein said predetermined service code is a digit string prepended to said telephone number.

5. The method of claim 3, wherein said predetermined service code is a port number.

6. The method of claim 1, wherein said translation request is a Session Initiation Protocol (SIP) INVITE message.

7. The method of claim 6, wherein said translation response is a SIP 3xx redirection response.

8. The method of claim 1, wherein said routing address is an Internet Protocol (IP) address.

9. The method of claim 1, wherein said first and second media messaging systems are voicemail platforms.

10. The method of claim 9, wherein said media message is a voicemail message.

11. The method of claim 1, further comprising:
a user selecting said destination mailbox;
said first media messaging system obtaining from said second media messaging system an announcement associated with said destination mailbox; and
said first media messaging system playing said announcement to said user.

12. The method of claim 11, wherein said announcement is a recorded name announcement.

13. The method of claim 11, wherein said first media messaging system obtaining from said second media messaging system an announcement associated with said destination mailbox comprises:
said first media messaging system sending an Internet Message Access Protocol (IMAP) FETCH command to said second media messaging system, via said packet-switched network; and
said first media messaging system receiving an IMAP FETCH response from said second media messaging system, said IMAP FETCH response including said announcement.

14. A method for call redirection comprising:
determining that an unsuccessful attempt to connect a call to a called party corresponds to a redirection condition;
obtaining a forwarding code for said called party based on said redirection condition;
transmitting a translation request to a translation server, said translation request including said forwarding code;
receiving a translation response from said translation server, said translation response including a routing address for routing to a media messaging system via a packet-switched network, wherein said media messaging system hosts a mailbox for said called party; and
transmitting call set-up signaling to said routing address to redirect said call to said media messaging system.

15. The method of claim 14, wherein said forwarding code comprises an identification of said called party and a service code.

16. The method of claim 15, wherein transmitting call set-up signaling to said routing address comprises:
transmitting a Session Initiation Protocol (SIP) INVITE message to said routing address, said SIP INVITE message including said identification of said called party.

17. The method of claim 15, wherein said identification of said called party is a telephone number of said called party.

* * * * *